United States Patent
Giraudo

(10) Patent No.: US 10,119,454 B1
(45) Date of Patent: Nov. 6, 2018

(54) FLOW MODEL INVERSION USING A MULTI-DIMENSIONAL SEARCH ALGORITHM

(71) Applicant: GM GLOBAL TECHNOLOGY OPERATIONS LLC, Detroit, MI (US)

(72) Inventor: Gabriele Giraudo, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/811,630

(22) Filed: Nov. 13, 2017

(51) Int. Cl.
| | |
|---|---|
| F01P 7/16 | (2006.01) |
| F01P 11/16 | (2006.01) |
| F01P 7/14 | (2006.01) |
| F01P 3/20 | (2006.01) |
| B60K 11/02 | (2006.01) |

(52) U.S. Cl.
CPC ............... F01P 7/164 (2013.01); F01P 11/16 (2013.01); *B60K 11/02* (2013.01); *F01P 3/20* (2013.01); *F01P 2007/146* (2013.01)

(58) Field of Classification Search
CPC .. F01P 7/164; F01P 11/02; F01P 11/16; F01P 2007/146
See application file for complete search history.

(56) References Cited

U.S. PATENT DOCUMENTS

| | | | | |
|---|---|---|---|---|
| 5,215,044 A | * | 6/1993 | Banzhaf | F01P 3/20 123/41.05 |
| 7,775,268 B2 | * | 8/2010 | Sato | B60H 1/00892 123/41.1 |
| 9,816,429 B2 | * | 11/2017 | Murai | F01P 3/02 |
| 9,869,232 B2 | * | 1/2018 | Abihana | F01P 7/164 |
| 2009/0283604 A1 | * | 11/2009 | Martinchick | B60H 1/034 237/12.3 B |
| 2011/0120394 A1 | * | 5/2011 | Onozawa | F01P 7/162 123/41.1 |
| 2013/0094972 A1 | * | 4/2013 | Smith | F01P 7/164 417/32 |
| 2015/0090236 A1 | * | 4/2015 | Chen | F02D 41/0077 123/568.12 |
| 2016/0195002 A1 | * | 7/2016 | Ito | F01P 11/14 236/34.5 |
| 2017/0016381 A1 | * | 1/2017 | Yumisashi | B60H 1/08 |

FOREIGN PATENT DOCUMENTS

JP 2003239742 A * 8/2003 ............. F01P 7/167

* cited by examiner

*Primary Examiner* — Grant Moubry
(74) *Attorney, Agent, or Firm* — Harness, Dickey & Pierce, P.L.C.

(57) ABSTRACT

A system and method for controlling engine coolant including generating one of a plurality of zone flow requests for engine coolant, generating a first search zone, determining a plurality of key points for the first search zone, determining a unique combination of commands for each key point of the plurality of key points in the first search zone, determining a flowrate associated with each command for each key point of the plurality of key points, calculating a total cost for each key point using an absolute normalized error for each flowrate of each command for each key point, determining a first winning key point associated with a lowest total cost, and controlling a plurality of actuators based on the commands associated with the first winning key point.

20 Claims, 5 Drawing Sheets ized error for each flowrate of each command for each key point of the plurality of key points in the first search zone, determining a first winning key point in the first search zone associated with a lowest total cost among the plurality of key points, generating commands regarding the first wining key point, and controlling actuators based on the commands.

FLOW MODEL INVERSION USING A MULTI-DIMENSIONAL SEARCH ALGORITHM

The present disclosure relates to vehicles with internal combustion engines and more particularly to systems and methods for controlling coolant flow by flow model inversion using a multi-dimensional search algorithm.

BACKGROUND

This section provides background information related to the present disclosure which is not necessarily prior art.

Vehicles include one or more torque producing devices, such as an internal combustion engine and/or an electric motor. Torque is generated by the internal combustion engine by the combustion of air and fuel within the cylinders. The combustion of air and fuel, known as the combustion stroke, generates heat and exhaust. Engine coolant absorbs and transfers heat from the various parts of a vehicle's cooling system to air or transfers heat from the engine coolant to various parts of a vehicle's cooling system.

Coolant control systems for a vehicle control the flow of engine coolant throughout various components of a cooling system such as a radiator, an engine oil cooler, the transmission oil cooler, and a cabin heat exchanger. Engine coolant flow is controlled by adjusting the position of one or more of a plurality of coolant valves and by adjusting a speed of a coolant pump. When the engine coolant is cooled to a desired temperature, the engine coolant is recirculated back through the cooling system.

SUMMARY

This section provides a general summary of the disclosure, and is not a comprehensive disclosure of its full scope or all of its features.

A system is provided and includes a coolant control system including a flow inversion module. The flow inversion module generates one of a plurality of zone flow requests for engine coolant based on a plurality of coolant temperature sensors, where each of the zone flow requests corresponds to a respective zone of a coolant system, generates, in response to receiving the plurality of zone flow requests for engine coolant, a first search zone, determines a plurality of key points for the first search zone, determines a unique combination of commands for each key point of the plurality of key points in the first search zone, where the unique combination of commands includes a command for each actuator of a plurality of actuators of the coolant system, determines a flowrate associated with each command for each key point of the plurality of key points, calculates a total cost for each key point of the plurality of key points in the first search zone, where the total cost is calculated using an absolute normalized error for each flowrate of each command for each key point of the plurality of key points in the first search zone, determines a first winning key point in the first search zone associated with a lowest total cost among the plurality of key points, and generates commands regarding the first wining key point. A flow control module that controls the plurality of actuators based on the commands generated by the flow inversion module.

A method includes generating one of a plurality of zone flow requests for engine coolant based on a plurality of coolant temperature sensors, where each of the zone flow requests corresponds to a respective zone of a coolant system, generating, in response to receiving the plurality of zone flow requests for engine coolant, a first search zone, determining a plurality of key points for the first search zone, determining a unique combination of commands for each key point of the plurality of key points in the first search zone, where the unique combination of commands includes a command for each actuator of a plurality of actuators of the coolant system, determining a flowrate associated with each command for each key point of the plurality of key points, calculating a total cost for each key point of the plurality of key points in the first search zone, where the total cost is calculated using an absolute normalized error for each flowrate of each command for each key point of the plurality of key points in the first search zone, determining a first winning key point in the first search zone associated with a lowest total cost among the plurality of key points, generating commands regarding the first wining key point, and controlling actuators based on the commands.

Further areas if applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
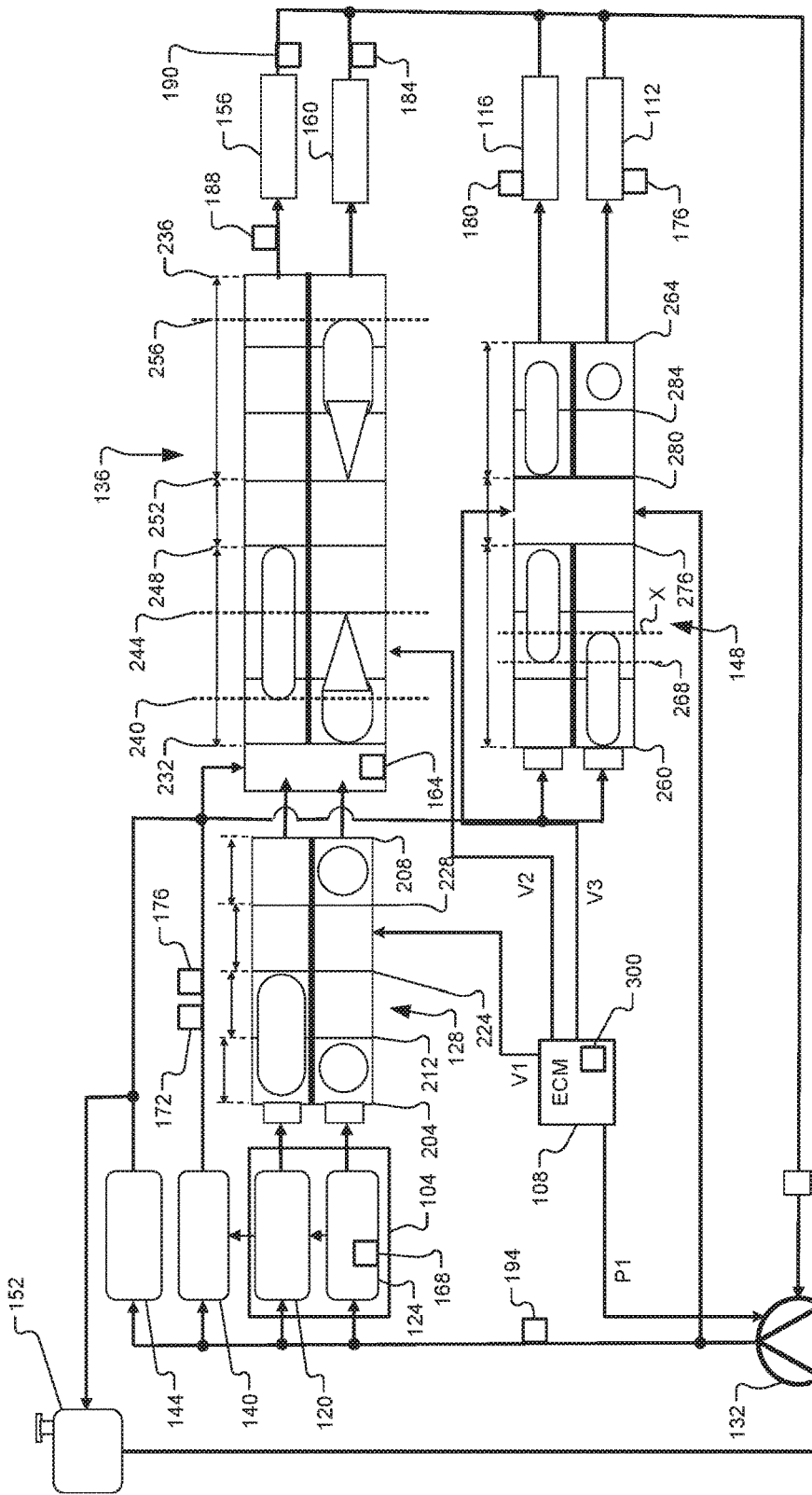
FIG. 1 is a functional block diagram of an example coolant system for a vehicle.

Example embodiments will now be described more fully with reference to the drawings.

In order to satisfy all coolant flow requests, with existing coolant control systems, fulfillment of coolant flow requests may be arbitrarily determined in order of priority from highest coolant flow request to lowest coolant flow request. The total possible coolant flow is constrained by the speed of the coolant pump. In instances where a plurality of coolant requests are received and the total requested flow of the plurality of coolant requests exceeds the total possible coolant flow, the coolant control system may not be able to keep up with the demands of the coolant control system. If the coolant control system cannot keep up with the demands for coolant requests, at least one or more of the coolant requests may be underflowed. Systems and methods for satisfying the plurality of coolant requests by optimizing fulfillment of coolant flow requests according to degree of importance as it relates to the operation of a vehicle are presented below.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" may encompass both an orientation of above and below. The device may be otherwise oriented (rotated 90 degrees or at other orientations) and the spatially relative descriptors used herein interpreted accordingly.

Referring now to FIG. 1, a functional block diagram of an example vehicle system is presented. An engine 104 combusts a mixture of air and fuel (e.g., diesel fuel or gasoline) within cylinders to generate drive torque. The engine 104 outputs torque to a transmission (not shown). The transmission transfers torque to one or more wheels of a vehicle via a driveline (not shown). An engine control module (ECM) 108 may control one or more engine actuators to regulate the torque output of the engine 104, for example, based on a target torque output of the engine 104.

An engine oil pump circulates engine oil through the engine 104 and a first heat exchanger 112. The first heat exchanger 112 may be referred to as the engine oil cooler or the engine oil heat exchanger (HEX). When the engine oil is cold, the first heat exchanger 112 may transfer heat to engine oil within the first heat exchanger 112 from coolant flowing through the first heat exchanger 112. When the engine oil is warm, the first heat exchanger 112 may transfer heat from the engine oil to coolant flowing through the first heat exchanger 112 and/or to air passing the first heat exchanger 112.

Viscosity of the engine oil is inversely related to temperature of the engine oil. That is, viscosity of the engine oil decreases as the temperature increases and vice versa. Frictional losses (e.g., torque losses) of the engine 104 associated with the engine oil may decrease as viscosity of the engine oil decreases and vice versa.

A transmission fluid pump circulates transmission fluid through the transmission and a second heat exchanger 116. The second heat exchanger 116 may be referred to as a transmission cooler or as a transmission heat exchanger. When the transmission fluid is cold, the second heat exchanger 116 may transfer heat to transmission fluid within the second heat exchanger 116 from coolant flowing through the second heat exchanger 116. When the transmission fluid is warm, the second heat exchanger 116 may transfer heat from the transmission fluid to coolant flowing through the second heat exchanger 116 and/or to air passing the second heat exchanger 116.

Viscosity of the transmission fluid is inversely related to temperature of the transmission fluid. That is, viscosity of the transmission fluid decreases as the temperature of the transmission fluid increases and vice versa. Losses (e.g., torque losses) associated with the transmission and the transmission fluid may decrease as viscosity of the transmission fluid decreases and vice versa.

The engine 104 includes a plurality of coolant channels through which engine coolant ("coolant") flow. For example, the engine 104 includes one or more coolant channels through a (cylinder) head portion 120 of the engine 104 and one or more coolant channels through a block portion 124 of the engine 104. The engine 104 may also include one or more other coolant channels through one or more other portions of the engine 104.

A coolant pump 132 pumps coolant to the coolant channels of the engine 104. The coolant pump 132 may be mechanically driven (e.g., by the engine 104). Alternatively, the coolant pump 132 may be an electric coolant pump. A first coolant valve (V1) 128 regulates coolant flow out of (and therefore through) the block portion 124 of the engine 104 and the head portion 120 of the engine 104.

The first coolant valve 128 may include a multiple-input, multiple-output valve that includes two or more separate chambers. For example, the first coolant valve 128 may include a rotary valve having a housing and a rotatable member inside of the housing. The rotating member includes channels or grooves that, for each of the separate chambers, regulate flow to one or more outputs of that chamber.

An example laid flat diagram of the first coolant valve 128 illustrating coolant flow to and from the first coolant valve 128 is provided in FIG. 1. The first coolant valve 128 (the rotatable member) may be actuated between two end positions 204 and 208. The first coolant valve 128 includes a first chamber (top in FIG. 1) and a second chamber (bottom in FIG. 1).

Coolant flows from the head portion 120 of the engine 104 to the first chamber and not the second chamber. Coolant flows from the block portion 124 of the engine 104 to the second chamber and not the first chamber. When the first chamber is receiving coolant, the first coolant valve 128 outputs coolant from the first chamber to a second coolant valve (V2) 136, which is discussed further below. When the second chamber is receiving coolant, the first coolant valve 128 outputs coolant from the second chamber to the second coolant valve 136.

When the first coolant valve 128 is positioned between the end position 204 and a first position 212, coolant flows through the head portion 120 of the engine 104 and into the first chamber and coolant flows through the block portion 124 of the engine 104 and into the second chamber. When the first coolant valve 128 is positioned between the first position 212 and a second position 224, coolant flows through the head portion 120 of the engine 104 flows and into the first chamber. However, the first coolant valve 128 blocks coolant flow through the block portion 124 and the second chamber when the first coolant valve 128 is positioned between the first position 212 and the second position 224.

The first coolant valve 128 blocks coolant flow through the block portion 124 and the second chamber when the first coolant valve 128 is positioned between the second position 224 and a third position 228. The first coolant valve 128 also blocks coolant flow through the head portion 120 and the first chamber when the first coolant valve 128 is positioned between the second position 224 and the third position 228.

When the first coolant valve 128 is positioned between the third position 28 and the end position 208, coolant flows through the block portion 124 of the engine 104 and into the second chamber. However, the first coolant valve 128 blocks coolant flow through the head portion 120 and the first chamber when the first coolant valve 128 is positioned between the third position 228 and the end position 208. The shapes within the first coolant valve 128 illustrate examples of relative openings into the first and second chambers of the first coolant valve 128.

The coolant pump 132 also pumps coolant through an integrated exhaust manifold (IEM) 140 of the engine 104 and a turbocharger turbine 144 of the engine 104. The turbocharger turbine 144 drives rotation of a turbocharger compressor which increases airflow into the engine 104. Exhaust output by the engine 104 drives rotation of the turbocharger turbine 144.

Coolant flows from the IEM 140 to the second coolant valve 136 and a third coolant valve 148, which is discussed further below. Coolant also flows from the turbocharger turbine 144 to the second coolant valve 136 the third coolant valve 148. Coolant may flow from the turbocharger turbine 144 into a reservoir (e.g., a surge tank) 152 under various circumstances, such as when the pressure of coolant output from the turbocharger turbine 144 is greater than a predetermined pressure.

The second coolant valve 136 receives coolant from the first coolant valve 128, the IEM 140, and the turbocharger turbine 144. The second coolant valve 136 regulates flow of the received coolant to the cabin heat exchanger (e.g., a heater core) 156 and the radiator heat exchanger 160.

The second coolant valve 136 may include a multiple-input, multiple-output valve that includes two or more separate chambers. The received coolant flows to both of the two chambers. For example, the second coolant valve 136 may include a rotary valve having a housing and a rotatable member inside of the housing. The rotating member includes channels or grooves that, for each of the separate chambers, regulate flow to one or more outputs of that chamber.

An example laid flat diagram of the second coolant valve 136 illustrating coolant flow to and from the second coolant valve 136 is provided in FIG. 1. The second coolant valve 136 (the rotatable member) may be actuated between two end positions 232 and 236. The second coolant valve 136 includes a first chamber (top in FIG. 1) and a second chamber (bottom in FIG. 1).

Received coolant flows from the first chamber to the cabin heat exchanger 156 when the first chamber is open. Received coolant flows from the second chamber to the radiator heat exchanger 160 when the second chamber is open.

When the second coolant valve 136 is positioned between the end position 232 and a first position 240, the first chamber of the second coolant valve 136 is closed and the second coolant valve 136 blocks coolant flow to the cabin heat exchanger 156. However, when the second coolant valve 136 is positioned between the end position 232 and the first position 240, the second chamber of the second coolant valve 136 is open and coolant flows through the second coolant valve 136 to the radiator heat exchanger 160.

When the second coolant valve 136 is positioned between the first position 240 and a second position 244, the first chamber of the second coolant valve 136 is open and coolant flows through the second coolant valve 136 to the cabin heat exchanger 156. When the second coolant valve 136 is positioned between the first position 240 and the second position 244, the second chamber of the second coolant valve 136 is also open and coolant flows through the second coolant valve 136 to the radiator heat exchanger 160.

When the second coolant valve 136 is positioned between the second position 244 and a third position 248, the first chamber of the second coolant valve 136 is open and coolant flows through the second coolant valve 136 to the cabin heat exchanger 156. However, when the second coolant valve 136 is positioned between the second position 244 and the third position 248, the second chamber of the second coolant valve 136 is closed and the second coolant valve 136 blocks coolant flow to the radiator heat exchanger 160.

When the second coolant valve 136 is positioned between the third position 248 and a fourth position 252, the first chamber and the second chamber are both closed. Thus, the second coolant valve 136 blocks coolant flow to the radiator heat exchanger 160 and the cabin heat exchanger 156.

When the second coolant valve 136 is positioned between the fourth position 252 and a fifth position 256, the first chamber of the second coolant valve 136 is closed and the second coolant valve 136 blocks coolant flow to the cabin heat exchanger 156. However, when the second coolant valve 136 is positioned between the fourth position 252 and the fifth position 256, the second chamber of the second coolant valve 136 is open and coolant flows through the second coolant valve 136 to the radiator heat exchanger 160.

The shapes within the second coolant valve 136 illustrate examples of relative openings from the first and second chambers of the second coolant valve 136.

The third coolant valve 148 receives coolant from the IEM 140 and the turbocharger turbine 144. The third coolant valve 148 regulates flow of the received coolant to the transmission oil heat exchanger 116 and the engine oil heat exchanger 112.

The third coolant valve 148 may include a multiple-input, multiple-output valve that includes two or more separate chambers. The received coolant flows to both of the two chambers. For example, the third coolant valve 148 may include a rotary valve having a housing and a rotatable member inside of the housing. The rotating member includes channels or grooves that, for each of the separate chambers, regulate flow to one or more outputs of that chamber.

An example laid flat diagram of the third coolant valve 148 illustrating coolant flow to and from the third coolant valve 148 is also provided in FIG. 1. The third coolant valve 148 (the rotatable member) may be actuated between two end positions 260 and 264. The third coolant valve 148 includes a first chamber (top in FIG. 1) and a second chamber (bottom in FIG. 1).

Received coolant flows from the first chamber to the transmission oil heat exchanger 116 when the first chamber is open. Received coolant flows from the second chamber to the engine oil heat exchanger 112 when the second chamber is open.

When the third coolant valve 148 is positioned between the end position 260 and a first position 268, the first chamber of the second coolant valve 136 is closed and the third coolant valve 148 blocks coolant flow to the transmission oil heat exchanger 116. However, when the third coolant valve 148 is positioned between the end position 260 and the first position 268, the second chamber of the third coolant valve 148 is open and coolant flows through the third coolant valve 148 to the engine oil heat exchanger 112.

When the third coolant valve 148 is positioned between the first position 268 and a second position 272, the first chamber of the third coolant valve 148 is open and coolant flows through the third coolant valve 148 to the transmission oil heat exchanger 116. When the third coolant valve 148 is positioned between the first position 268 and the second position 272, the second chamber of the third coolant valve 148 is also open and coolant flows through the third coolant valve 148 to the engine oil heat exchanger 112.

When the third coolant valve 148 is positioned between the second position 272 and a third position 276, the first chamber of the third coolant valve 148 is open and coolant flows through the third coolant valve 148 to the transmission oil heat exchanger 116. However, when the third coolant valve 148 is positioned between the second position 272 and the third position 276, the second chamber of the third coolant valve 148 is closed and the third coolant valve 148 blocks coolant flow to the engine oil heat exchanger 112.

The third coolant valve 148 may also receive coolant output by the coolant pump 132. When the third coolant valve 148 is positioned between the third position 276 and a fourth position 280, the third coolant valve 148 blocks coolant flow from the IEM 140 and the turbocharger turbine 144 to the engine oil heat exchangers 112 and the transmission oil heat exchangers 116. However, when the third coolant valve 148 is positioned between the third position 276 and the fourth position 280, coolant output by the coolant pump 132 may flow through the third coolant valve 148 to the engine and transmission oil heat exchangers 112 and 116.

When the third coolant valve 148 is positioned between the fourth position 280 and a fifth position 284, the first chamber of the third coolant valve 148 is open and coolant flows through the third coolant valve 148 to the transmission oil heat exchanger 116. However, when the third coolant valve 148 is positioned between the fourth position 280 and the fifth position 284, the second chamber of the third coolant valve 148 is closed and the third coolant valve 148 blocks coolant flow to the engine oil heat exchanger 112.

When the third coolant valve 148 is positioned between the end position 264 and the fifth position 284, the first chamber of the second coolant valve 136 is closed and the third coolant valve 148 blocks coolant flow to the transmission oil heat exchanger 116. However, when the third coolant valve 148 is positioned between the end position 264 and the fifth position 284, the second chamber of the third coolant valve 148 is open at some positions and coolant flows through the third coolant valve 148 to the engine oil heat exchanger 112.

The first, second, and third coolant valves 128, 136, and 148 may be referred to as active thermostat valves. Unlike passive thermostat valves which automatically open and close when a coolant temperature is greater than and less than a predetermined temperature, respectively, active thermostat valves are electrically actuated.

The cabin heat exchanger 156 transfers heat from coolant flowing through the cabin heat exchanger 156 to air passing the cabin heat exchanger 156 to warm a passenger cabin of the vehicle. The radiator heat exchanger 160 transfers heat from coolant flowing through the radiator heat exchanger 160 to air passing the radiator heat exchanger 160 to cool the coolant. Cooled coolant may be used to cool the engine 102 and other vehicle components.

When the engine oil is cold, the engine oil heat exchanger 112 may transfer heat from coolant flowing through the engine oil heat exchanger 112 to the engine oil. When the engine oil is warm, the engine oil heat exchanger 112 may transfer heat from the engine oil to air passing the engine oil heat exchanger 112 and/or coolant flowing through the engine oil heat exchanger 112. When the transmission oil is cold, the transmission oil heat exchanger 116 may transfer heat from coolant flowing through the transmission oil heat exchanger 116 to the transmission oil. When the transmission oil is warm, the transmission oil heat exchanger 116 may transfer heat from the transmission oil to air passing the transmission oil heat exchanger 116 and/or coolant flowing through the transmission oil heat exchanger 116.

A first coolant temperature sensor 164 measures a first temperature of coolant input to the second coolant valve 136. A block temperature sensor 168 measures a temperature of the block (metal) portion 124 of the engine 104. A head temperature sensor 172 measures a temperature of the head (metal) portion 120 of the engine 104. A head pressure sensor 172 may be implemented and measure a pressure of the coolant in the head (metal) portion 120 of the engine 104.

An engine oil temperature sensor 176 measures a temperature of the engine oil, such as within the engine oil heat exchanger 112. A transmission oil temperature sensor 180 measures a temperature of the transmission oil, such as within the transmission oil heat exchanger 116.

A second coolant temperature sensor 184 measures a second temperature of coolant output from the radiator heat exchanger 160. A third coolant temperature sensor 188 measures a third temperature of coolant input to the cabin heat exchanger 156. A fourth coolant temperature sensor 190 measures a fourth temperature of coolant output from the cabin heat exchanger 156. A fifth coolant temperature sensor 194 measures a fifth temperature of coolant output from the coolant pump 132 and input to the head portion 120, the block portion 124, the IEM 140, and the turbocharger turbine 144.

One or more other sensors may also be implemented, such as one or more other coolant temperature sensors, a crankshaft position sensor, a mass air flowrate (MAF) sensor, a manifold absolute pressure (MAP) sensor, and/or one or more other suitable vehicle sensors.

The coolant temperature sensors 164-194 may provide signals indicative of the respective measurements to a coolant control module 300. Based at least partially on one or more of the measurements provided by the coolant temperature sensors 164-194, the coolant control module 300 controls a speed of the coolant pump 132, the position of the first coolant valve 128, the position of the second coolant valve 136, and the position of the third coolant valve 148. While the example of the coolant control module 300 being implemented within the ECM 108 is shown, the coolant control module 300 may be implemented within another module or independently.

Examples of coolant zones include: the head portion 120 of the engine 104, the block portion 124 of the engine 104, the IEM 140, the turbocharger turbine 144, the cabin heat exchanger 156, the radiator heat exchanger 160, the engine oil heat exchanger 116, and the transmission oil heat exchanger 116. While these example zones are provided, additional coolant zones may be considered.

Figure 2:
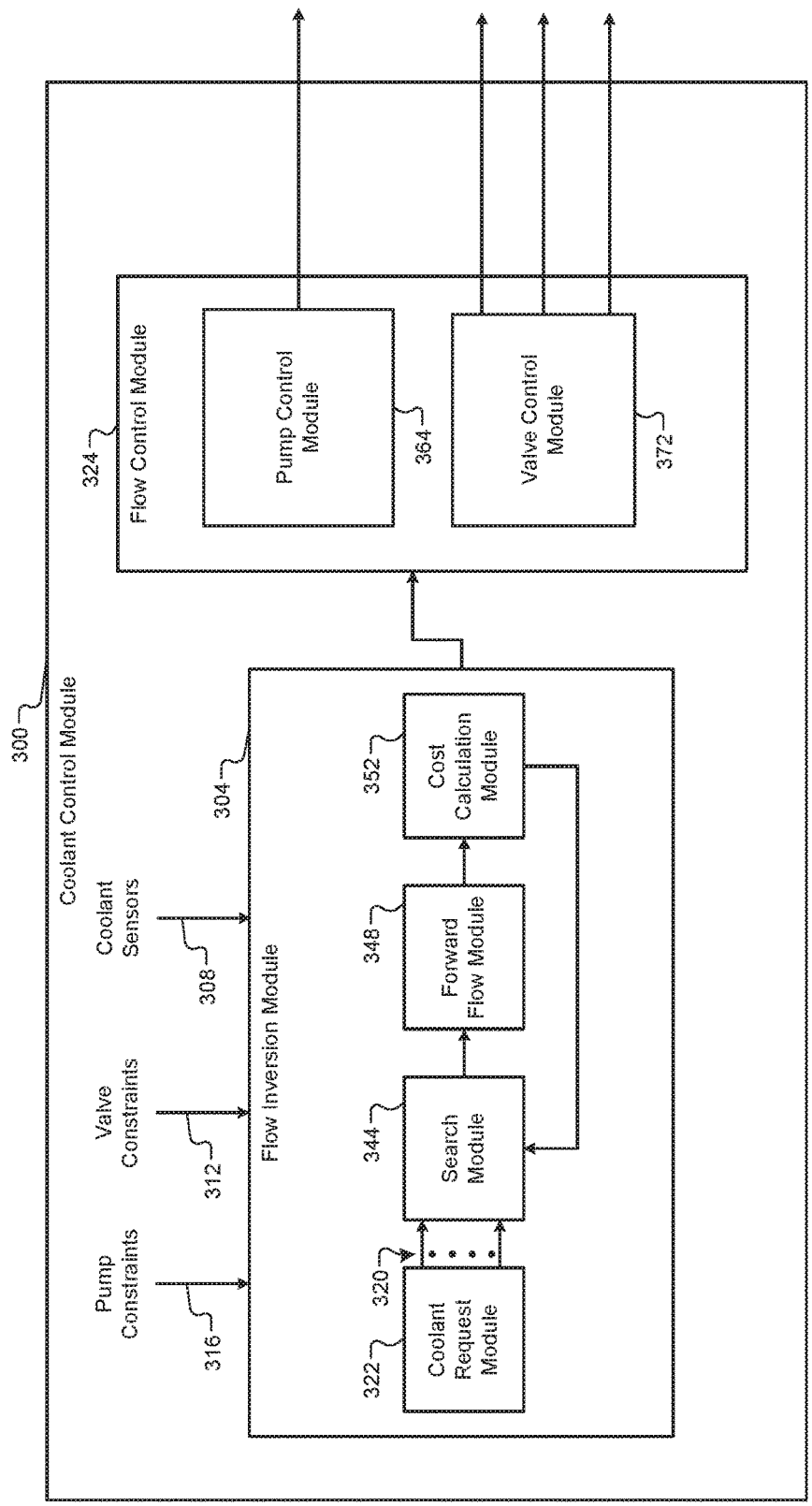
FIG. 2 is a functional block diagram of an example of a coolant control system according to the present disclosure.
Figure 3A:
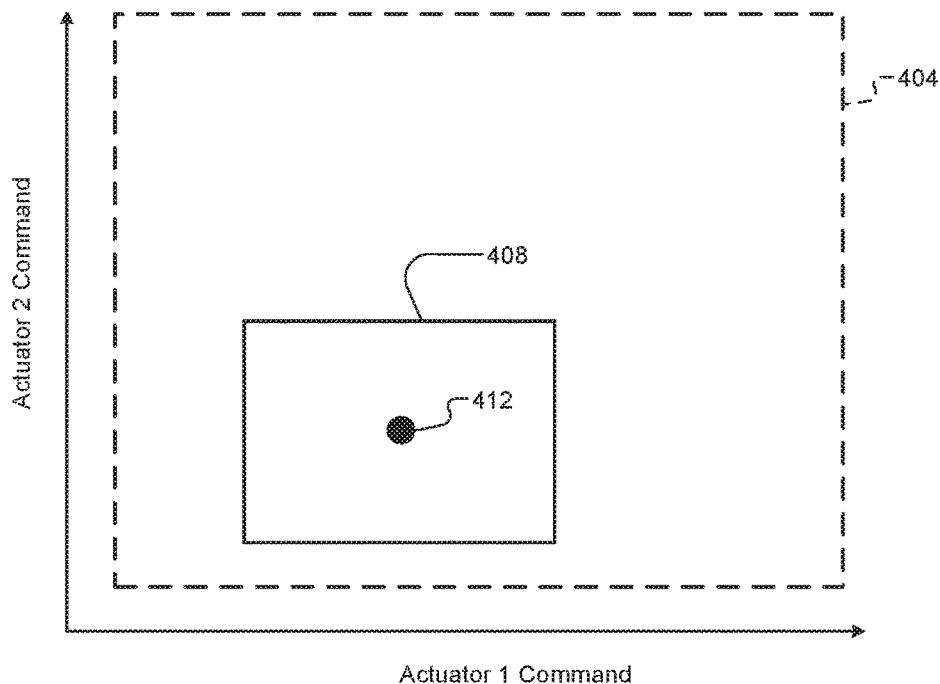
FIGS. 3A and 3B are functional block diagrams including examples of a first search zone and a preselected command zone.
Figure 3B:
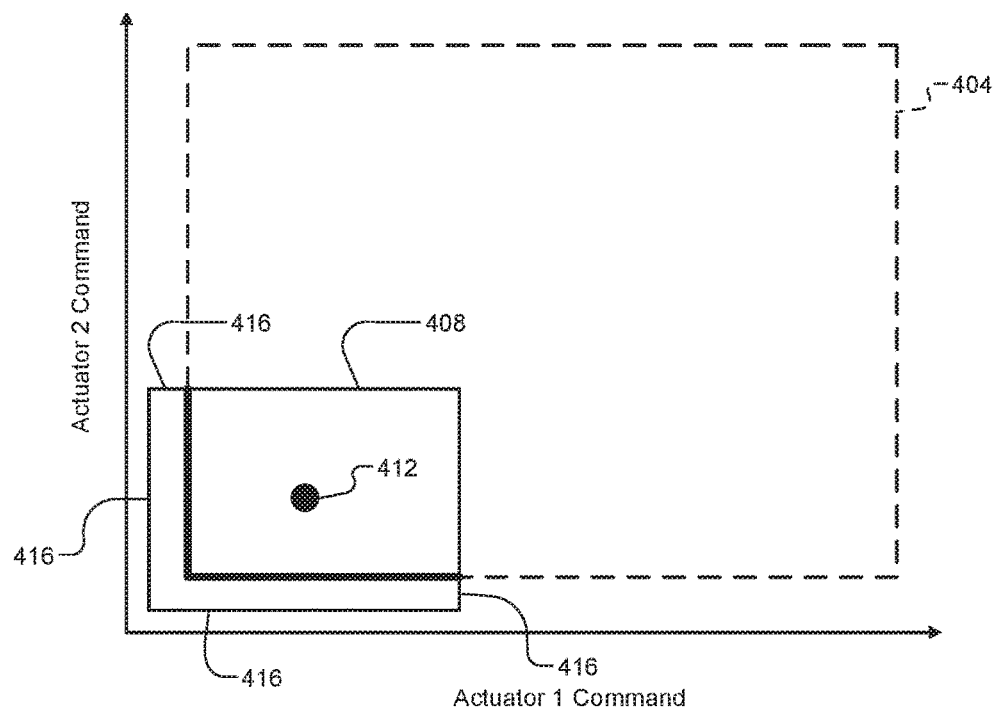

With reference to FIGS. 2, 3A, and 3B, a functional block diagram of an example implementation of the coolant control module 300 and an example of a preselected command range 404 including a first search zone 408 are presented. The coolant control module 300 includes a flow inversion module 304 and a flow control module 324. The flow inversion module 304 includes a coolant request module 322, a search module 344, a forward flow module 348, and a cost calculation module 352. The coolant request module 322 generates a plurality of zone flow requests 320. The zone flow requests 320 may be generated from closed loops on the coolant temperature signals received from the various coolant temperature sensors 164-194. The zone flow requests 320 may also be mapped as function of various inputs or may come from other control modules. Each of these zone flow requests 320 corresponds to a respective zone of the coolant system.

The search module 344 receives the plurality of zone flow requests 320 from the coolant request module 322. In response to receiving the plurality of zone flow requests 320, the search module 344 generates the first search zone 408 starting from a number of actuators, the plurality of zone flow requests 320, the valve constraints 312 and the pump constraints 316. The valve constraints 312 may include the current valve position, a maximum change in position for the valve, and/or other suitable information. The pump constraints 316 may include a current speed of the pump in revolutions per minute (RPM), a maximum change in RPM for the pump, and/or other suitable information.

Coolant control systems for a vehicle control the flow of engine coolant throughout various components of a cooling system such as a radiator, an engine oil cooler, the transmission oil cooler, and a cabin heat exchanger. Engine coolant flow is controlled by adjusting the position of one or more of a plurality of coolant valves and by adjusting a speed of a coolant pump through the respective actuators. When the engine coolant is cooled to a desired temperature, the engine coolant is recirculated back through the cooling system.

A center point 412 of the first search zone 408 is based on the previous position of the valves 128, 136, and 148 and previous speed of the pump 132. The previous positions of the valves 128, 136, 148 and the previous speed of the pump 132, are obtained from the valve position feedbacks and the pump speed feedback of the closed loops. After the center point 412 for the first search zone 408 is determined, the search module 344 then adds or subtracts the maximum change in position for the valves 128, 136, and 148 over a predetermined period and/or the maximum change in revolutions per minute (RPM) for the coolant pump 132 over the predetermined period in order to determine a plurality of limits of the first search zone 408 (i.e., the minimum value and the maximum value for each actuator of the plurality of actuator). The predetermined period may be any period of time. For example, the predetermined period may be set at a decisecond (100 ms).

Using the valve constraints 312 and the pump constraints 316, three possible future commands are calculated for each actuator. The three possible future commands that are calculated are a current command, a maximum command and a minimum command. The current command is the previous command for the actuator immediately preceding the zone flow request 320. The maximum command is the current command plus the maximum change in position for the actuator over the predetermined period. The minimum command is the current command minus the maximum change in position for the actuator over the predetermined period. The maximum command and minimum command for each actuator define the plurality of limits of the first search zone 408. For example, if the cabin heater valve 136 was previously in a position of X degrees and the maximum change in position for the cabin heater valve 136 in the predetermined period is Y degrees, the search module 344 will generate three possible positions for the cabin heater valve 136: X, X-Y and X+Y. Each key point of the plurality of key points 412 and 510-524 represents a unique combination of possible future actuator commands.

FIG. 3A shows an example of the first search zone 408 generated by the search module 344. The center point 412 corresponds to the previous positions for the valves 128, 136, and 148 and previous speed of pump 132. In FIG. 3A, the plurality of limits of the first search zone 408 correspond to the minimum actuator command and the maximum actuator command for actuators 1 and 2, respectively. In FIG. 3A, the plurality of limits of the first search zone 408 is within a plurality of limits of the preselected command zone 404. The preselected command zone 404 represents an area for the valves 128, 136, and 148 that define an operable range (e.g., in degrees) for the valves 128, 136, and 148 in order to accomplish the desired task. For example, for engine oil warming mode, the third coolant valve 148 may have a range of 0 degrees to 25 degrees. In another example, for transmission oil warming mode, the third coolant valve 148 may have a range from 25 degrees to 50 degrees. The degree of opening for the valves 128, 136, and 148 may vary depending on the type of valve. The list of examples is not meant to be exhaustive and is provided for illustration purposes only.

FIG. 3B shows an example of the first search zone 408. Upon determining that at least one of a plurality of limits 416 of the first search zone 408 exceeds at least one of the plurality of limits of the preselected command zone 404, the search module 344 truncates the plurality of limits 416 of the first search zone 408 that exceeds the plurality of limits of the preselected command zone 404. In this example, the plurality of limits 416 of the first search zone 408 exceeds the plurality of limits of the preselected command zone 404. As a result, the plurality of limits 416 of the first search zone 408 is truncated (i.e., the maximum command and the minimum command for the respective actuator are truncated). The truncated limits of the first search zone 408 are replaced with the plurality of limits of the preselected command zone 404 that were exceeded. In response to determining that the limits of the first search zone 408 have been truncated, the search module 344 determines a second center point, the second center point being in the middle of the truncated first search zone 408.

With reference back to FIG. 2, the forward flow module 348 determines a number of key points for the first search zone 408. A number of key points of the first search zone 408 are calculated using the following relationship:

$$\text{number of key points} = 3^x \quad \text{(Equation 1)},$$

where x is the total number of actuators. For example, if two actuators are present, the number of key points may be nine. In another example, if three actuators are present then the number of key points may be twenty seven.

Each key point of the plurality of key points 412 and 510-524 in the first search zone 408 represents a unique combination of commands for each actuator of the plurality of actuators of the coolant system. The commands for each key point of the plurality of key points 412 and 510-524 in the first search zone 408 may represent a unique combination of degree of openings for the valves 128, 136, and, 148 or a unique combination of flowrates for the valves 128, 136, and 148 and a unique value for speed of the pump 132 in RPM.

Figure 4A:
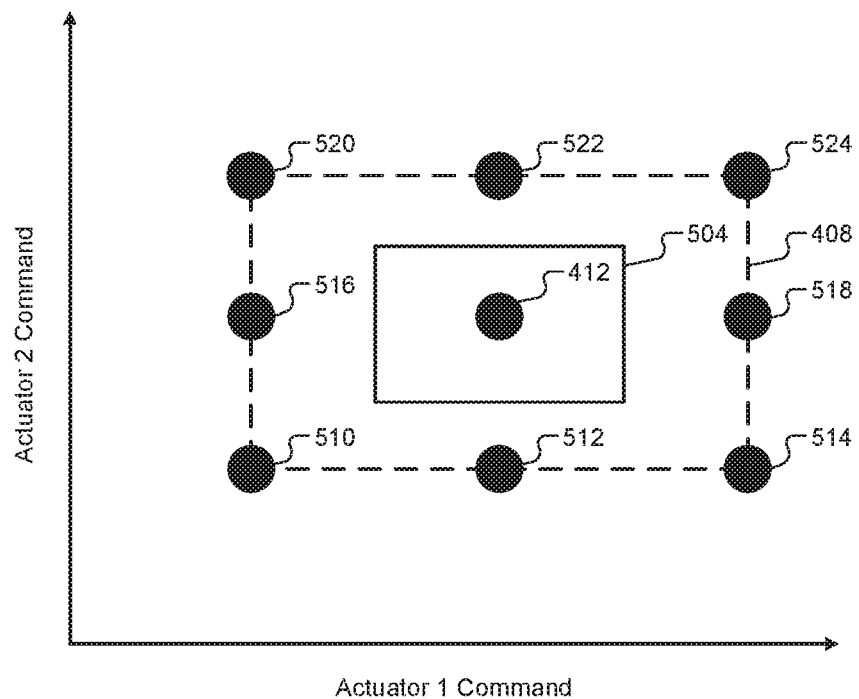
FIGS. 4A and 4B are functional block diagrams including a first search zone and a second search zone.

With reference now to FIG. 4A, an example of the first search zone 408 is shown. In this example, the first search zone 408 was generated for a system with two actuators. The first search zone 408 comprises nine unique key points 412 and 510-524 that are calculated following the rules previously described. The forward flow module 348 calculates the flowrates associated with each key point of the plurality of key points 412 and 510-524.

With reference back to FIG. 2, after the forward flow module 348 has calculated the unique combination of commands for each key point of the plurality of key points 412 and 510-524 in the first search zone 408, the cost calculation module 352 calculates an absolute normalized error for each zone flow request (i.e., for each flowrate of each command) of each key point of the plurality of key points 412 and 510-524 using the following formula:

$$\text{zone flow absolute normalized error} = \frac{(|RZF - PZF|)}{MZF}, \quad \text{(Equation 2)}$$

where the zone flow absolute normalized error is a unit less measurement, MZF is the maximum zone flowrate, RZF is the requested zone flowrate, and PZF is the point zone flowrate. After each normalized error is calculated, the cost calculation module 352 calculates a total cost for each key point taking into account a priority for each zone flow request 320. Priority is defined based on dividing the flows into three categories: controlled flow constraints, soft flow constraints (e.g., cabin heating), hard flow constraints (e.g., low pressure exhaust gas recirculation). In addition some parts of the search area may be defined as not-usable. For example, if a base zone flowrate is 30 liters/minute, the cabin heating requested flowrate is 10 liters/minute, and one key point of the plurality of key points 412 and 510-524 in the first search zone 408 may provide the cabin heating zone the flowrate of 7 liters/minute, the zone flow absolute normalized error would be 0.10.

For controlled flow constraints, the cost is equal to the zone flow absolute normalized error. For soft flow constraints, the cost is set equal to zone flow absolute normalized error when the coolant zones are underflowing and zero when the coolant zones are overflowing. For hard flow constraints, the cost is, for example, equal to 1000 times the zone flow absolute normalized error when the coolant zones are underflowing and zero when coolant zones are overflowing. The predetermined formula is derived so that hard flow constraints are given higher priority than soft flow constraints. For the parts of the first search zone 408 that are considered not usable, the cost is considered to be infinite. The coolant zones are considered to be underflowing when the zones receive less coolant than the coolant request module 322 requests for the zones. The coolant zones are considered to be overflowing when the zones receive more coolant than the coolant request module 322 requests for the zones.

FIG. 4A shows an example of a second search zone 504 within the first search zone 408. After the cost calculation module 352 calculates the total cost for each key point of the plurality of key points 412 and 510-524 in the first search zone 408, the cost calculation module 352 will determine a winning key point for the first search zone 408. The winning key point represents the key point of the plurality of key points 412 and 510-524 in the first search zone 408 associated with the lowest total cost.

In FIG. 4A, the winning key point of the plurality of key points 412 and 510-524 corresponds to the center point 412. However, the winning key point may be any key point of the plurality of key points 412 and 510-524 in the first search zone 408. In response to determining the winning key point of the plurality of points 412 and 510-524, the search module 344 generates the second search zone 504 around the winning key point. The plurality of limits of the second search zone 504 are determined by the following:

$$A1 \text{ limits of second search zone} = \left(\frac{1}{2}\right) * (A1\text{MAX} - A1\text{MIN}) \quad \text{(Equation 3.1)}$$

$$A2 \text{ limits of second search zone} = \left(\frac{1}{2}\right) * (A2\text{MAX} - A2\text{MIN}) \quad \text{(Equation 3.2)}$$

$$Ax \text{ limits of second search zone} = \left(\frac{1}{2}\right) * (Ax\text{MAX} - Ax\text{MIN}), \quad \text{(Equation 3.3)}$$

where A1 represents actuator 1, A2 represents actuator 2, Ax represents actuator x, A1MAX represents the maximum command for actuator 1 in the first search zone 408, A1MIN represents the minimum command for actuator 1 in the first search zone 408, A2MAX represents the maximum command for actuator 2 in the first search zone 408, A2MIN represents the minimum command for actuator 2 in the first search zone 408, AxMAX represents the maximum command for actuator x in the first search zone 408, and AxMIN represents the minimum command for actuator x in the first search zone 408. For example, if a system with two actuators is used, the second search zone 504 may be equal to one quarter the size of the limits for the respective valve 128, 136, and 148 of the first search zone 408.

Figure 4B:
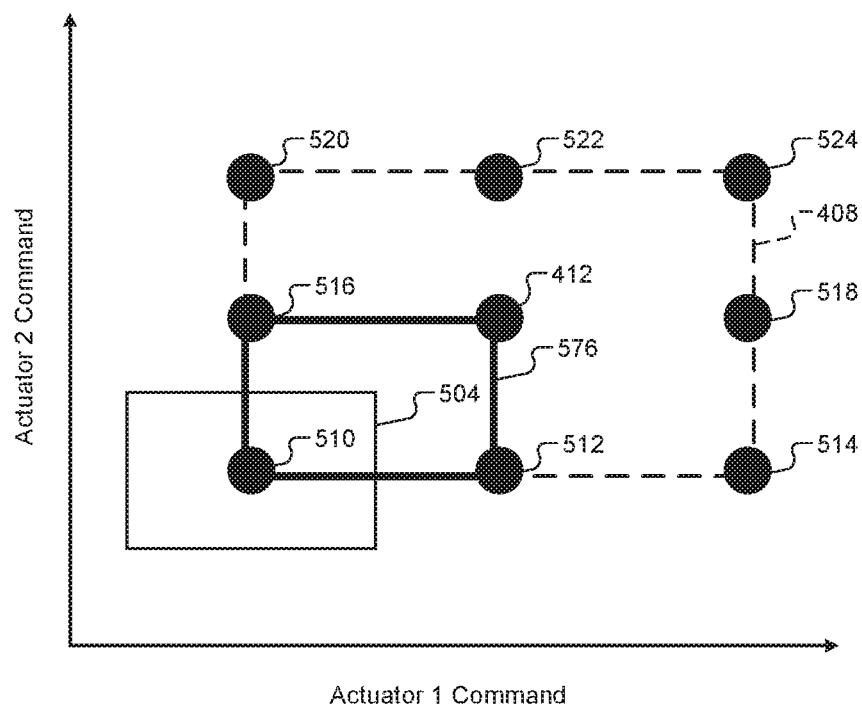

In FIG. 4A, the plurality of limits of the second search zone 504 is within the plurality of limits of the first search zone 408. In another example, FIG. 4B, the plurality of limits of the second search zone 504 exceeds the plurality of limits of the first search zone 408. In response to a determination that at least one of the plurality of limits of the second search zone 504 exceeds at least one of the plurality of limits of the first search zone 408, the second search zone 504 is shifted so that the plurality of limits of the second search zone 504 is within the plurality of limits of the first search zone 408. From FIG. 4B, the second search zone 504 is shifted and becomes a shifted second search zone 576. In response to the shifted second search zone 576 being shifted a third center point is generated corresponding to a position in the middle of the shifted second search zone 576. The process may be repeated generating a third zone, a fourth zone, and etc. until a predetermined maximum number of iterations have been performed or a predetermined cost threshold has been reached.

With reference back to FIG. 2, the flow inversion module 304 generates commands associated with a final winning key point of a final search zone to the flow control module 324. The final winning key point of the final search zone refers to the key point associated with the lowest cost or the key point associated with the last iteration of a predetermined maximum number of iterations. The flow control module 324 controls the actuators based on the commands generated by the flow inversion module 304. The flow control module 324 includes a valve control module 372 that controls the first coolant valve 128, the second coolant valve 136, and the third coolant valve 148. In response to the flow control module 324 receiving the commands, the valve control module 372 actuates the first coolant valve 128, the second coolant valve 136 and the third coolant valve 148 to satisfy the degree of openings of the valves 128, 136, and 148 and/or zone flow request 320 flowrates required by the commands associated with the final winning key point of the final search zone. The flow control module 324 also includes a pump control module 364 that controls the coolant pump 132. The pump control module 364 actuates the coolant pump 132 to satisfy the speed of the coolant pump 132 required by the commands associated with the final winning key point of the final search zone.

Figure 5:
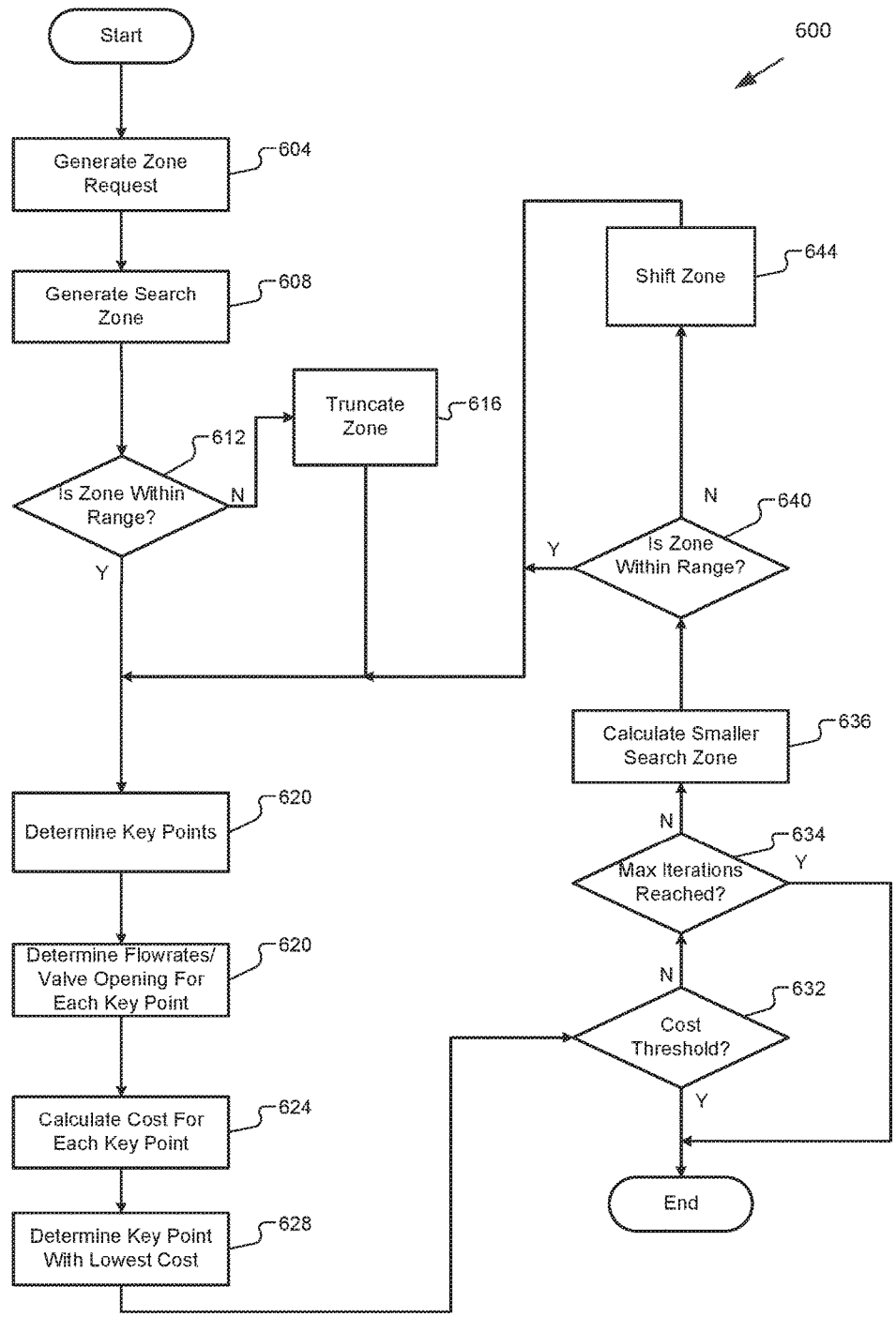
FIG. 5 is a flowchart depicting a method of controlling coolant flow of according to the present disclosure.

With reference to FIG. 5, a method 600 for controlling the actuators of the coolant system in response to receiving the zone flow requests 320 is shown. The method 600 may be performed by the coolant control module 300, the flow inversion module 304, the flow control module 324, a combination thereof, etc. At 604, the coolant request module 322 generates at least one of the plurality of zone flow requests 320 for coolant based on coolant temperature signals received from the various coolant temperature sensors 164-194. The zone flow requests 320 may be calculated from closed loops on the coolant temperature signals received from the various coolant temperature sensors 164-194. The zone flow requests 320 may also be mapped as function of various inputs or may come from other control modules.

At 608, the search module 344 generates the first search zone 408 based on the center point 410. At 612, the search module 344 determines whether the plurality of limits first search zone 408 (i.e., the minimum value and the maximum value for each actuator of the plurality of actuators) is within the plurality of limits of the preselected command zone 404. The search module 344 may determine whether the plurality of limits of the first search zone 408 is within the plurality of limits of the preselected command zone 404 by comparing the plurality limits of the first search zone 408 to the plurality of limits of the preselected command zone 404. In response to the determination that at least one of the plurality of limits of the first search zone 408 exceeds at least one of the plurality of limits of the preselected command zone 404, the search module 344 makes a determination that the first search zone 408 is not within the plurality of limits of the preselected command zone 404. If 612 is true, the method 600 continues at 620. If 612 is false, the method 600 continues at 616.

At 616, the search module 344 truncates the first search zone 408. The first search zone 408 is truncated so that the plurality of limits 416 of the first search zone 408 that exceeds the plurality of limits of the preselected command zone 404 is replaced with the plurality of limits of the preselected command zone 404 that were exceeded, and the method 600 continues at 620.

At 620 the forward flow module 348 determines the number of key points in the first search zone 408 using Equation 1. At 620, the forward flow module 348 also determines a unique combination of actuator commands associated with each zone for each key point of the plurality of key points 412 and 510-524 and where to place the plurality of key points 412 and 510-524 within the first search zone 408 to ensure a uniform distribution.

At 620, the forward flow module 348 determines flowrates for each zone of each key point of the plurality of key points 412 and 510-524 in the first search zone 408. At 624, the cost calculation module 352 calculates the total cost for each of the key points of the plurality of key points 412 and 510-524 in the first search zone 408 using Equation 2. At 628, the cost calculation module 352 determines the winning key point of the first search zone 408. At 632, the cost calculation module 352 determines if the winning key point is within a predetermined threshold. If false, the method 600 continues at 634. If true, the flow inversion module 304 sends the commands to the flow control module 324 and the method 600 may end. While FIG. 5 is shown as ending, FIG. 5 may be illustrative of one control loop that may be repeated. At 634 the flow inversion module 304 determines whether a predetermined maximum number of iterations have been performed. If false, control may continue at 636. If true, the flow inversion module 304 sends the commands to the flow control module 324 and the method 600 may end.

At 636, the search module 344 calculates the second search zone 504 based on the first search zone 408 (e.g., using Equations 3.1-3.3) and the method 600 continues at 640. At 640, the search module 344 determines whether the plurality of limits of the second search zone 504 is within the plurality of limits of the first search zone 408. If true, the method 600 continues at 620. If false, the method 600 continues at 644.

At 644, the search module 344 shifts the second search zone 504 so that the plurality of limits of the shifted second search zone 576 is within the plurality of limits of the first search zone 408. After the second search zone 504 has been shifted, the method 600 continues at 620. While method 600 is explained in the context of the first search zone 408 and the second search zone 504, the same method 600 may continue until a predetermined maximum number of iterations have been performed. Steps 620-644 represent a continuous control loop that is executed until the control conditions 632 or 634 are satisfied.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A coolant control system comprising:
    a flow inversion module that:
        generates one of a plurality of zone flow requests for engine coolant based on a plurality of coolant temperature sensors, wherein each of the zone flow requests corresponds to a respective zone of a coolant system;
        generates, in response to receiving the plurality of zone flow requests for engine coolant, a first search zone;
        determines a plurality of key points for the first search zone;
        determines a unique combination of commands for each key point of the plurality of key points in the first search zone, wherein the unique combination of commands comprises an actuator command for each actuator of a plurality of actuators of the coolant system;
        determines a flowrate associated with each command for each key point of the plurality of key points;
        calculates a total cost for each key point of the plurality of key points in the first search zone, wherein the total cost is calculated using an absolute normalized error for each flowrate of each command for each key point of the plurality of key points in the first search zone;
        determines a first winning key point in the first search zone associated with a lowest total cost among the plurality of key points; and
        generates commands regarding the first wining key point; and
    a flow control module that controls the plurality of actuators based on the commands generated by the flow inversion module.

2. The coolant control system of claim 1, wherein the first search zone is truncated in response to a first determination that at least one of a plurality of limits of the first search zone exceeds at least one of a plurality of limits of a preselected command zone.

3. The coolant control system of claim 2, wherein a second search zone is generated in response to a second determination that the first winning key point is not within a predetermined cost threshold and a maximum number of iterations have not been performed.

4. The coolant control system of claim 3, wherein the second search zone is shifted so that the plurality of limits of the second search zone is within the plurality of limits of the first search zone in response to a third determination that at least one of the plurality of limits of the second search zone exceeds at least one of the plurality of limits of the first search zone.

5. The coolant control system of claim 1, wherein:
    a number of the plurality of key points in the first search zone is at least one of based on a number of actuators of the coolant system that have requested engine coolant and based on the plurality of zone flow requests, and
    a plurality of limits of the first search zone are based on a plurality of valve constraints and pump constraints.

6. The coolant control system of claim 5, wherein:
    at least one of the plurality of valve constraints correspond to a maximum change of a position of at least one of a plurality of coolant valves over a predetermined period,
    the pump constraints correspond to a second maximum change for a speed of a coolant pump over the predetermined period, and
    the zone flow requests are at least one of calculated from closed loops on coolant temperature signals received from the plurality of coolant temperature sensors and mapped as a function of various inputs.

7. The coolant control system of claim 1, wherein the flow control module includes a pump control module that controls a speed of a coolant pump.

8. The coolant control system of claim 7, wherein the commands include adjusting the speed of the coolant pump.

9. The coolant control system of claim 1, wherein the flow control module includes a valve control module that controls at least one of a plurality of coolant valves.

10. The coolant control system of claim 9, wherein the commands include adjusting a position associated with at least one of the plurality of coolant valves.

11. A method comprising:
    generating one of a plurality of zone flow requests for engine coolant based on a plurality of coolant temperature sensors, wherein each of the zone flow requests corresponds to a respective zone of a coolant system;
    generating, in response to receiving the plurality of zone flow requests for engine coolant, a first search zone;
    determining a plurality of key points for the first search zone;
    determining a unique combination of commands for each key point of the plurality of key points in the first search zone, wherein the unique combination of commands comprises an actuator command for each actuator of a plurality of actuators of the coolant system;
    determining a flowrate associated with each command for each key point of the plurality of key points;
    calculating a total cost for each key point of the plurality of key points in the first search zone, wherein the total cost is calculated using an absolute normalized error for each flowrate of each command for each key point of the plurality of key points in the first search zone;
    determining a first winning key point in the first search zone associated with a lowest total cost among the plurality of key points;
    generating commands regarding the first wining key point; and
    controlling actuators based on the commands.

12. The method of claim 11, wherein the first search zone is truncated in response to a first determination that at least one of a plurality of limits of the first search zone exceeds at least one of a plurality of limits of a preselected command zone.

13. The method of claim 12, wherein a second search zone is generated in response to a second determination that the first winning key point is not within a predetermined cost threshold and a maximum number of predetermined iterations have not been performed.

14. The method of claim 13, wherein the second search zone is shifted so that the plurality of limits of the second search zone is within the plurality of limits of the first search zone in response to a third determination that at least one of the plurality of limits of the second search zone exceeds at least one of the plurality of limits of the first search zone.

15. The method of claim 11 wherein:
a number of the plurality of key points in the first search zone is at least one of based on a number of actuators of the coolant system that have requested engine coolant and based on the plurality of zone flow requests, and
a plurality of limits of the first search zone are based on a plurality of valve constraints and pump constraints.

16. The method of claim 15, wherein:
at least one of the plurality of valve constraints correspond to a maximum change of a position of at least one of a plurality of coolant valves over a predetermined period,
the pump constraints correspond to a second maximum change for a speed of a coolant pump over the predetermined period, and
the zone flow requests are at least one of calculated from closed loops on coolant temperature signals received from the plurality of coolant temperature sensors and mapped as a function of various inputs.

17. The method of claim 11, further comprising controlling a speed of a coolant pump.

18. The method of claim 17, wherein controlling the speed of the coolant pump includes adjusting the speed of the coolant pump based on the commands.

19. The method of claim 11, further comprising controlling at least one of a plurality of coolant valves.

20. The method of claim 19, wherein controlling at least one of the plurality of coolant valves includes adjusting a position of at least one of the plurality of coolant valves based on the commands.

* * * * *